(12) United States Patent
Guilliard et al.

(10) Patent No.: US 11,378,990 B2
(45) Date of Patent: Jul. 5, 2022

(54) TEMPERATURE CONTROL DEVICE, USE OF SAID DEVICE, METHOD FOR PRODUCING A HOUSING AND HOUSING

(71) Applicant: STEGO-Holding GmbH, Schwaebisch Hall (DE)

(72) Inventors: Dietmar Guilliard, Mainhardt-Gailsbach (DE); Robert Dent, Schwäbisch Hall (DE); Elmar Mangold, Unterschneidheim (DE)

(73) Assignee: STEGO-HOLDING GMBH, Kolpingstrabe (DE)

( * ) Notice: Subject to any disclaimer, the term of this patent is extended or adjusted under 35 U.S.C. 154(b) by 619 days.

(21) Appl. No.: 16/300,304

(22) PCT Filed: May 10, 2017

(86) PCT No.: PCT/EP2017/061182
§ 371 (c)(1),
(2) Date: Nov. 9, 2018

(87) PCT Pub. No.: WO2017/194606
PCT Pub. Date: Nov. 16, 2017

(65) Prior Publication Data
US 2019/0121376 A1    Apr. 25, 2019

(30) Foreign Application Priority Data
May 12, 2016 (DE) .................. 10 2016 108 840.4

(51) Int. Cl.
*G05D 23/19* (2006.01)
*B21C 23/14* (2006.01)
(Continued)

(52) U.S. Cl.
CPC ....... *G05D 23/1919* (2013.01); *B21C 23/142* (2013.01); *B21C 35/026* (2013.01);
(Continued)

(58) Field of Classification Search
CPC .............. G05D 23/1919; G05D 23/24; G05D 23/2754; H01H 37/04; H01H 9/042;
(Continued)

(56) References Cited

U.S. PATENT DOCUMENTS

D193,618 S     9/1962   Reed
D225,453 S    12/1972   Hill
(Continued)

FOREIGN PATENT DOCUMENTS

CN    202947813 U     5/2013
CN    203950214 U    11/2014
(Continued)

OTHER PUBLICATIONS

PCT/EP201 7/061182, English translation of international Preliminary Report on Patentability and Written Opinion, dated Dec. 11, 2017, 12 pages
(Continued)

*Primary Examiner* — Shawntina T Fuqua
(74) *Attorney, Agent, or Firm* — Boyle Fredrickson, S.C.

(57) ABSTRACT

The invention relates to a device for temperature control in potentially explosive areas, comprising a temperature controller (10) and a housing (11) in which the temperature controller (10) is arranged, the housing (11) having a sealed opening (12) through which electrical lines (13, 14) of the temperature controller (10) are passed. It is characterized in that the temperature controller (10) has a measuring surface (15) which lies directly against an inner wall (16) of the housing (11) at least in certain areas and is electrically connected to an earthing tab (17), said earthing tab (17) being electrically connected to another line (18) which is guided through the opening (12).

8 Claims, 6 Drawing Sheets

(51) Int. Cl.

| | | |
|---|---|---|
| *B21C 35/02* | (2006.01) | |
| *G05D 23/275* | (2006.01) | |
| *H01H 9/04* | (2006.01) | |
| *H02G 15/013* | (2006.01) | |
| *H02G 15/007* | (2006.01) | |
| *G01D 11/24* | (2006.01) | |
| *H01H 37/04* | (2006.01) | |
| *G05D 23/24* | (2006.01) | |

(52) U.S. Cl.
CPC ............ *G01D 11/24* (2013.01); *G05D 23/24* (2013.01); *G05D 23/2754* (2013.01); *H01H 9/042* (2013.01); *H01H 37/04* (2013.01); *H02G 15/007* (2013.01); *H02G 15/013* (2013.01); *Y10T 29/49105* (2015.01)

(58) Field of Classification Search
CPC .... G01D 11/24; H02G 15/007; H02G 15/013; B21C 23/142; B21C 35/026; Y10T 29/49105
See application file for complete search history.

(56) References Cited

U.S. PATENT DOCUMENTS

| | | | |
|---|---|---|---|
| 4,479,107 | A | 10/1984 | Bleeke |
| D365,029 | S | 12/1995 | Gaskell et al. |
| 5,810,618 | A | 9/1998 | Barbier et al. |
| 6,342,140 | B1 | 1/2002 | Weyl et al. |
| D664,633 | S | 7/2012 | Mangold |
| D804,624 | S | 12/2017 | Dent |
| D805,618 | S | 12/2017 | Dent |
| 2008/0299820 | A1 | 12/2008 | Schelonka et al. |
| 2010/0108020 | A1* | 5/2010 | Miretti .................. H02G 3/088 123/198 D |
| 2013/0328659 | A1 | 12/2013 | Hall et al. |
| 2015/0023391 | A1 | 1/2015 | Sannier et al. |
| 2015/0346045 | A1 | 12/2015 | Habibi |

FOREIGN PATENT DOCUMENTS

| | | |
|---|---|---|
| CN | 104204745 | 12/2014 |
| DE | 2359274 A1 | 6/1975 |
| DE | 2359274 | 10/1978 |
| DE | 2359274 A1 | 10/1978 |
| DE | 19540339 A1 | 4/1997 |
| DE | 10243383 B3 | 2/2004 |
| DE | 202004019381 U1 | 2/2005 |
| DE | 102010032022 | 1/2012 |
| DE | 102013223216 | 5/2015 |
| DE | 202015007851 | 12/2015 |
| DE | 102016015726 A1 | 11/2017 |
| EP | 2650898 | 1/2017 |
| JP | H8-23175 | 1/1996 |
| WO | 2003002865 | 1/2003 |
| WO | 2008028629 | 3/2008 |

OTHER PUBLICATIONS

CN 201780029255.2 Examination Report dated May 15, 2020, 6 pages.
CN 201780029255.2 Notice of Allowance Action dated Jul. 13, 2021, 4 pages.
JP2018-558665 Office Action dated Jun. 29, 2021, 4 pages and English translation, 4 pages.
CN 201780029255.2 Office Action dated Sep. 27, 2020, 6 pages.
Ex-Thermostat Serie REx 0118, Stego, undated, 1 page.
Duden et al.; "Article Duden Online Begriff massiv"; https://www.duden.de/rechtschreibung/mas1; Bibilographic Institute Ltd, 2022—(8) pages.

* cited by examiner

TEMPERATURE CONTROL DEVICE, USE OF SAID DEVICE, METHOD FOR PRODUCING A HOUSING AND HOUSING

BACKGROUND AND SUMMARY OF THE DISCLOSURE

The invention relates to a device for temperature control in potentially explosive areas with the features of the preamble of claim 1. The invention relates further to the use of the device and a method for producing a housing and a housing.

Special requirements must be observed in the temperature control of heaters in potentially explosive areas. The controllers or thermostats used for this purpose must be adequately protected or designed to prevent an explosion due to a contact spark during switching under load or due to electrostatic discharge. The ATEX Directive of the European Union specifies the requirements for the respective devices and systems which may be used in potentially explosive areas. With the controllers or heating devices approved for this purpose, so-called EX controllers or EX heaters, for example, it is necessary that the outer housing has an earthing connection to prevent electrostatic charging of the housing. The electrical components arranged in the housing require an additional ground connection. With the devices usually available on the market for temperature control in potentially explosive areas with the features of the preamble of claim 1, the temperature controller arranged in the housing is protected by a ground connection in the housing. However, this makes the manufacture and assembly of the device more difficult. Furthermore, the switching accuracy of such a well-known device is unsatisfactory, especially when controllers with high switching capacity are used, which enable direct control of the heaters connected to the controller.

If high currents are applied to the temperature controller, it heats up due to the physically given internal resistance. The resulting drift of the switching point or the hysteresis behavior of the controller is disadvantageous.

In addition, electrical equipment used in potentially explosive areas must be hermetically sealed to prevent exclusive mixtures from entering the equipment.

The invention is based on the object of simply improving the control accuracy of a device for temperature control in potentially explosive areas of the type mentioned above. The invention is also based on the object of indicating the use of this device. In addition, the invention is based on the object of specifying a method for producing a housing that permits the manufacture of housings at low manufacturing costs, which can be used, among other things, in connection with electronic components, specifically temperature controllers, in potentially explosive areas. The invention is also based on the object of creating such a housing.

According to the invention, the object with regard to the device for temperature control in potentially explosive areas is achieved by the subject matter of claim 1 and with regard to its use by the subject matter of claim 9. With regard to the manufacturing process, the problem is solved according to the invention by the subject matter of claim 10 and with regard to the housing by the subject matter of claim 13.

The invention is based on the concept of specifying a device for temperature control in potentially explosive areas, comprising a temperature controller and a housing in which the temperature controller is arranged. The housing has a sealed opening through which the electrical cables of the temperature controller pass. The temperature controller has a measuring surface that lies directly against an inner wall of the housing at least in certain areas and is electrically connected to an earthing tab. The earthing tab is electrically connected to another cable that passes through the opening and preferably forms a unit.

The invention has the advantage that an optimal heat transfer from the temperature controller to the environment and vice versa is possible due to the direct contact of the measuring surface on the inner wall of the housing. In other words, the bidirectional heat transfer between the temperature controller and the environment is significantly improved.

This has advantages for various applications of the device according to the invention.

When high currents are applied to the temperature controller, it is desirable to dissipate the resulting heat as quickly and effectively as possible. The direct contact of the temperature controller or its measuring surface with the inner wall of the housing prevents the formation of an insulating air layer between the housing and the temperature controller and improves the cooling of the temperature controller. This increases the measuring and thus the control accuracy and stability of the switching points.

The direct temperature exchange with the environment creates a temperature equilibrium that supports the accuracy of the controller. In this case, it makes sense to use the device according to the invention as a room controller, because the outside of the housing is then freely accessible in the area of the measuring surface, so that good cooling of the housing and thus of the temperature controller located directly on the inner wall of the housing is possible.

The good heat transfer properties can also be used well in the other direction, i.e. with a heat gradient that drops towards the temperature controller, because the heat flow is then quickly and effectively transferred to the temperature controller via the housing wall. In this case, the device according to the invention is particularly suitable as a contact sensor, in which the housing wall is connected to a component in the area of the measuring surface or contacts the component whose temperature is to be measured.

The advantage of the earthing tab, which is electrically connected to the measuring surface, is that the ground connection cannot be made via the housing, but via another cable, which is electrically connected to the earthing tab. Together with the existing electrical cables of the temperature controller, this is passed through the opening in the housing to the outside. This facilitates the manufacture of the device according to the invention. In addition, the earthing tab has the advantage that the temperature controller can be well placed in the housing so that the measuring surface can be placed directly against the inner wall of the housing.

Another advantage of the invention is that the earthing tab and the temperature controller or the components of the temperature controller, such as the control system and the measuring surface (sensors), form a unit that can be handled together during installation. This offers a significant relief compared to the state of the art, where the grounding of the controller is done by an electrical contact with the housing.

Preferred embodiments are indicated in the subclaims.

The earthing tab can extend along one side wall of the temperature controller and protrude over its front side. In this embodiment, the compact and space-saving design of the temperature controller is an advantage, as the earthing tab can be guided closely to the side wall of the temperature controller or lies directly against the side wall of the temperature controller. The earthing tab is therefore routed in the direction of the electrical connections of the temperature controller, which are connected to the lines. The controller, which forms a unit with the earthing tab, is therefore formed in a particularly compact way and easy to install. The earthing tab projecting over the front is easily accessible for connection to the other electrical cable.

In another embodiment, the free end of the earthing tab is angled towards the temperature controller, further facilitating the connection with the other electrical cable.

The measuring surface preferably forms a lateral shoulder which is electrically connected to the earthing tab. This also improves the compact shape of the temperature controller, because the earthing tab is flush to the side of the measuring surface due to the shoulder.

Preferably, the device has a strain relief device for the lines, which is arranged in the opening. The strain relief device is also used for sealing the opening.

In another preferred embodiment, the temperature controller is rotationally symmetrical. It is particularly advantageous if the temperature controller is designed in the form of a button thermostat. The rotationally symmetrical temperature controller contributes to simplifying the manufacturing of the device, because the receiving space in the housing for the temperature controller can be created through a simple blind hole. In addition, the earthing tab eliminates the need to connect the ground to the housing, as it is directly connected to the live part.

The temperature controller can be connected to the inner wall of the housing in a materially bonded manner, e.g. by a contact connection, such as a heat paste. In addition or alternatively, a heat conducting plate can be arranged between the measuring surface and the inner wall. This is a particularly simple way of connecting the temperature controller directly to the inner wall of the housing.

In addition or alternatively, a mechanical preload can be applied to the temperature controller, e.g. by a compression spring, which presses the measuring surface against the inner wall.

The temperature controller has a bimetal switch which has proven to be particularly reliable in connection with temperature control in potentially explosive areas.

According to claim 9, the device according to the invention is used as a contact controller or as a room controller. When the device is used as a contact controller, the good heat transfer properties are used to measure the temperature of the contacted component. The device can be used as a room controller when the device is used to control a heater, specifically when the device is used with high currents to directly control the heater, because the heat generated in the temperature controller is then well dissipated to the outside.

According to the invention, a method for the production of housings for electronic components, in particular temperature controllers, is also proposed, in which a solid housing block is extruded, which has a front and a rear side with a holding profile for connection to a top-hat rail. The housing block is cross-cut to form several housings. Receiving spaces for electronic components are introduced into the housing or the housing block. It is therefore possible to insert receiving spaces before cutting to length, i.e. before dividing the connected, solid housing block. Alternatively, the receiving spaces can be inserted into the individual housings after dividing, in which case a receiving space is inserted into one housing at a time.

The housings manufactured in this way are particularly suitable for use with the device according to the invention for temperature control in potentially explosive areas, since such housings are integral and thus enable optimum hermetic sealing of the temperature controller arranged in the housing. It is also possible to use the housings manufactured according to the invention in other technical areas where a hermetic sealing of the temperature controller or of the electronic component in general is required, e.g. in environments with high humidity, where high IP protection classes are required.

Another advantage of the method according to the invention is that the manufacturing costs are significantly reduced.

Preferably, the receiving spaces are introduced by a cutting process, in particular by drilling.

Furthermore, a groove in the direction of extrusion is preferably inserted into one side, in particular into the underside of the housing block, which has an internal toothing for a retaining screw. The retaining screw can be connected to a cable for potential equalization of the housing to prevent electrostatic charging of the housing. Preferably the internal toothing of the groove is formed during extrusion. It is also possible to insert the groove with the internal toothing elsewhere into the housing, for example by a cutting process such as milling.

According to the invention, a housing for an electronic component is proposed, in particular a temperature controller, having a front side and a rear side, which has a retaining profile for connection to a DIN rail. The housing is made integrally and has a receiving space for the electronic component. Preferably, the housing is manufactured by a method according to the invention. Integral means that the housing walls merge continuously into each other, i.e. they are not composed of individual parts. In addition, openings are missing, except for the opening for the cable bushing, which penetrates the housing walls, as is often the case for riveted joints in the state of the art.

In a particularly preferred embodiment, the housing is made of a conductive material, especially aluminum or an aluminum alloy. This reduces the risk of electrostatic charging of the housing. In addition, the use of aluminum or an aluminum alloy improves the heat transfer properties of the housing so that the heat transfer to the temperature controller is improved in the case of a contact controller.

The housing preferably has further functionalities such as screw fastenings oriented in different directions, i.e. lateral and rear screw fastenings, a DIN clip and an earthing connection. The front of the housing can be designed with a visually appealing design.

Preferably, the receiving space has an opening that forms a cable bushing for the electronic component. The opening is also used for mounting the electronic component, specifically the temperature controller.

The designations "front side, rear side, underside and top" refer to the alignment or position of the housing when it is installed. The rear of the housing is connected to a top-hat rail.

The device can also be described as an appliance or product.

BRIEF DESCRIPTION OF THE DRAWINGS

The invention is explained in more detail below using an exemplary embodiment with reference to the attached schematic drawings, wherein.

DETAILED DESCRIPTION OF THE DRAWINGS

Figure 1:
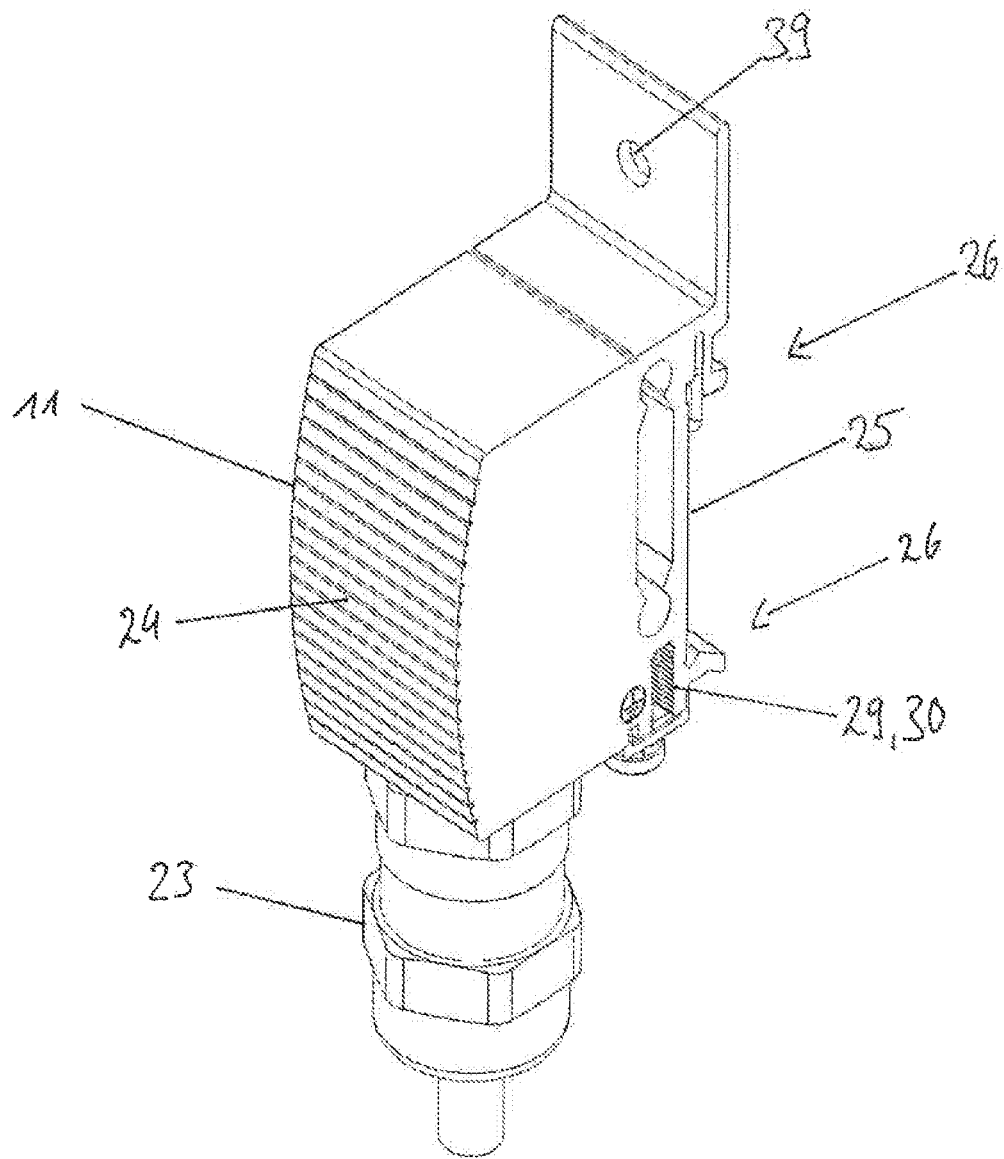
FIG. 1 shows a perspective view of a device for temperature control in potentially explosive areas according to an exemplary embodiment according to the invention.
Figure 2:
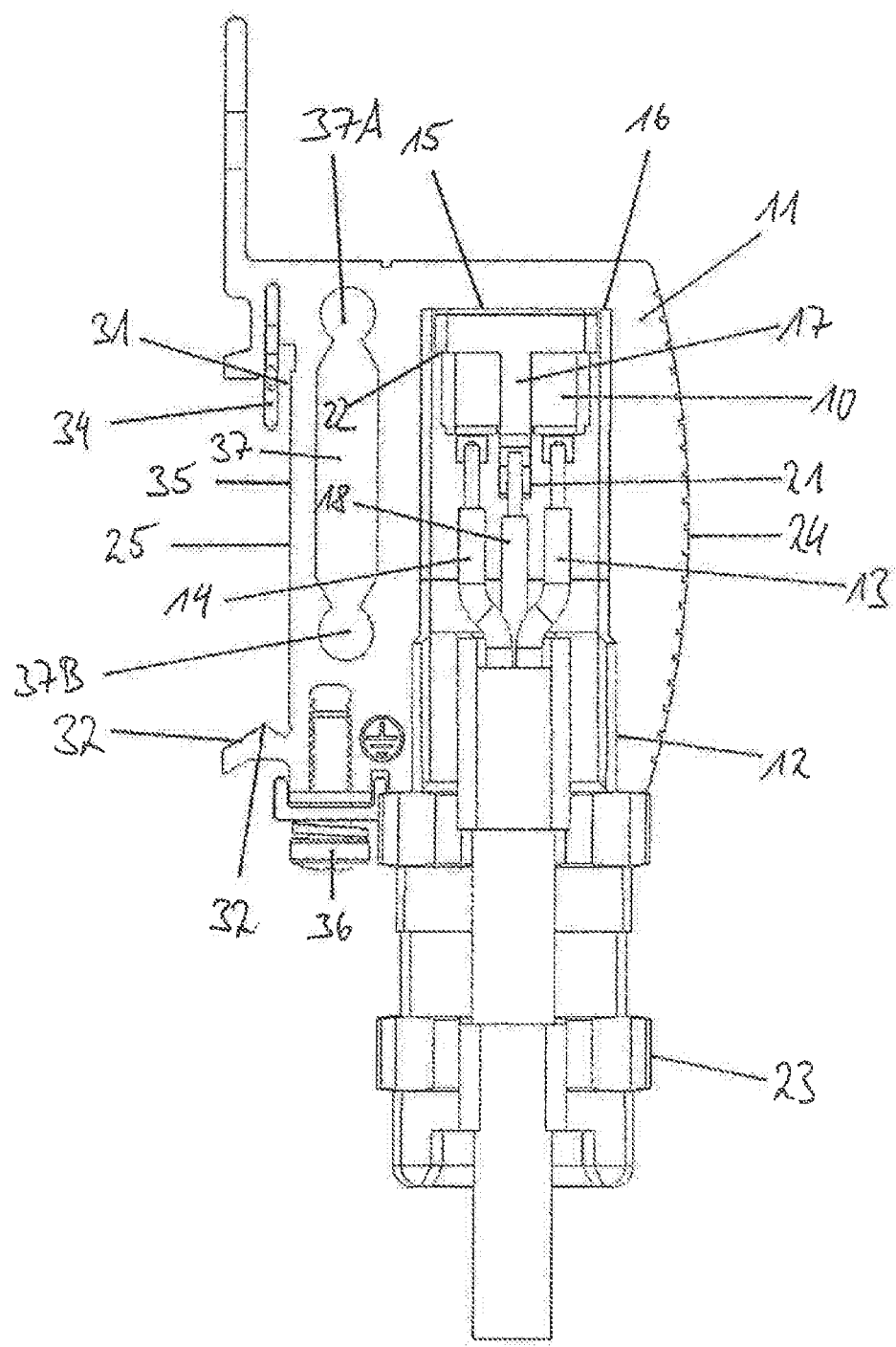
FIG. 2 shows a section through the device according to FIG. 1.

The device for temperature control, as shown in FIGS. 1 and 2, is intended for use in potentially explosive areas in which temperature measurement is to be carried out, for example, in a flammable gas atmosphere or in a dust-laden environment. The device is therefore sealed against gases or dust.

For this purpose, the device has a temperature controller 10, which is arranged in a housing 11. Housing 11 has an opening 12 through which electrical lines 13, 14 of temperature controller 10 are guided to the outside. Opening 12 is sealed in a manner known per se so that gases or other substances cannot enter the housing. Opening 12 is sealed by a strain relief device 23, which is screwed into opening 12 or otherwise connected to it. The connection between the strain relief device 23 and the housing 11 is sufficiently tight to be used in hazardous areas. In particular, the connection complies with valid ATEX standards.

Housing 11 has an internal bore which forms a cavity or receiving space 27 for the temperature controller 10. The temperature controller 10 is rotationally symmetrical, in particular essentially cylindrical, so that it fits into the cavity. In general, the shape and size of the temperature controller 10 and the shape and size of the receiving space 27 are coordinated in this way. The temperature controller does not necessarily have to be round. Angular temperature controllers are also possible.

For the control of an appliance, e.g. a heater, by the temperature controller, the latter is connected in a manner known per se to electrical lines 13, 14, which are routed to the outside through opening 12 and the device for the strain relief 23. The electrical lines 13, 14 are sheathed. Specifically, the electrical lines 13, 14 are connected to corresponding contact connections located on a first end face 20 of the temperature controller.

The electrical lines 13, 14 are connected to a bimetal switch (not shown), which is located inside the temperature controller 10 and forms the temperature sensor of the temperature controller. As can be seen well in FIG. 2, the temperature controller 10 has a measuring surface 15. The bimetal switch is located behind measuring surface 15 inside the temperature controller.

During operation of the temperature controller 10, a heat flow is transported through the measuring surface 15 into its interior, i.e. to the bimetal switch, which closes or opens when the switching point is exceeded. The measuring surface 15 is formed on a second end face of the temperature controller 10. As can be clearly seen in FIG. 2, the area of the measuring surface 15, which forms the second end face of the temperature controller 10, is directly connected to an inner wall 16 of the housing 11 and rests against it. This improves the heat transfer from the temperature controller 10 to the housing and vice versa.

Direct contact means on the one hand a direct abutment without intermediate layers, so that the measuring surface 15 directly touches the inner wall 16. On the other hand, a combination of the measuring surface 15 with the inner wall 16 by means of heat conducting paste and/or heat conducting plates is also understood as direct contact, because this is a materially bonded connection between measuring surface 15 and inner wall 16, which causes a good heat transfer.

The measuring surface 15 is not only limited to the front side of the temperature controller 10, but forms a peripheral ring which is arranged concentrically to a side wall 19 of the temperature controller. In other words, the measuring surface 15 forms a front cap or hood that surrounds the wall of the temperature controller 10 at least in certain areas. The annular section of the measuring surface and the straight, end face section of the measuring surface 15 are connected integrally to each other.

Figure 3:
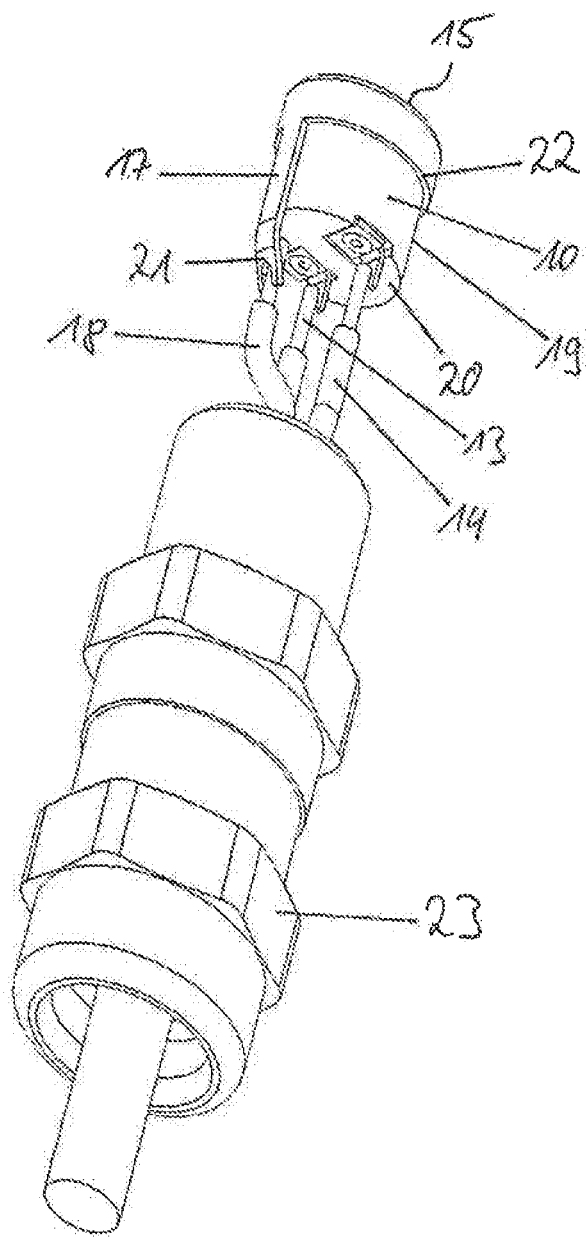
FIG. 3 shows a perspective view of the temperature controller according to FIG. 1 with connected electrical cables.

As can be seen in FIGS. 2, 3, the device has an earthing tab 17 which is electrically connected to the measuring surface 15. The earthing tab 17 is connected concretely to the annular section of the measuring surface 15. This can be produced by a soldered, welded, glued connection or in one piece. As can clearly be seen in FIG. 3, the earthing tab 17 extends parallel to the side wall 19 of the temperature controller 10 and thus along the side wall 19. The earthing tab 17 rests against the side wall 19 and projects over the end face 20 of the temperature controller 10. The free end 21 of the earthing tab 17 is angled inwards, i.e. towards temperature regulator 10 and forms a fork for receiving the further electrical line 18. As can be seen further in FIGS. 2, 3, the measuring surface 15, specifically the annular section of the measuring surface 15, forms a shoulder 22, which merges into the earthing tab 17 and is thus electrically connected to it. This is a direct fixed connection with the electrically conductive contacts.

The above-mentioned connection of the earthing tab 17 with the measuring surface 15 enables direct contact of the measuring surface 15, specifically of the front section of the measuring surface 16 with the inner wall 16 of the housing 11. For this purpose, the temperature controller 10 is subjected to a contact pressure. In the simplest case, this is generated by lines 13, 14, 18, which have an excess length between the strain relief device 23 and the end face 20 of the temperature controller 10, so that lines 13, 14, 18 press the temperature controller 10 against the inner wall 16. Alternatively or additionally a compression spring can be used. Furthermore, a materially bonded connection between the temperature regulator 10 and the inner wall 16 of the housing 11 is possible by means of a heat conducting paste or a heat conducting plate.

Housing 11 is disclosed and claimed both in connection with the temperature control device, i.e. in combination with the temperature controller 10 arranged in housing 11.

Figure 4:
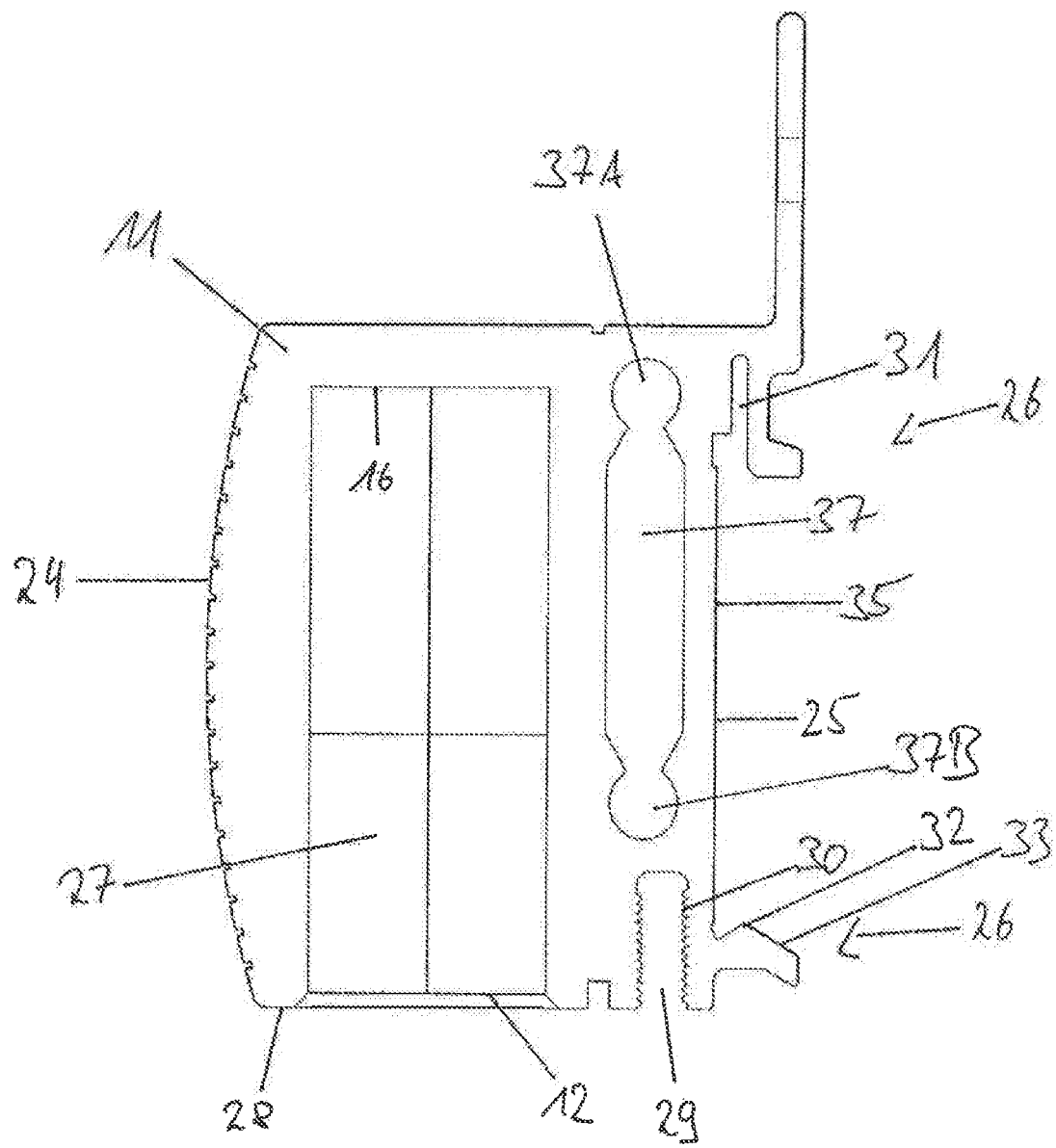
FIG. 4 shows a section through the housing according to FIG. 1 without installations.

In addition, housing 11 is disclosed and claimed as such, i.e. without the temperature controller 10 arranged in housing 11, since housing 11 is also suitable as such for accommodating other electronic components as temperature controllers. The section of housing 11 is shown in FIG. 4. The housing 11 shown in FIG. 4 and the following explanations in connection with the housing 11 are also revealed in connection with the device for temperature control in potentially explosive areas. FIGS. 1 to 6 concern one and the same housing.

The housing 11 is made of a conductive material, which limits the risk of electrostatic charging of the housing 11. In concrete terms, the housing is made of aluminum or an aluminum alloy.

As can be clearly seen in the section according to FIG. 4, the housing 11 is in one piece. This means that the housing 11 is not assembled from several individual parts, but forms a single monolithic component with continuous walls. This applies not only to the plane of intersection shown in FIG. 4, but also to the entire housing 11.

Housing 11 has a receiving space 27 in which the temperature controller, as shown in FIG. 2 for example, or another electronic component can be arranged. The receiving space 27 is designed as cylindrical blind holes. Other embodiments are possible.

Receiving space 27 has an opening 12, which is formed on the underside 28 of housing 11. On the one hand, opening 12 provides access to the receiving space for mounting the temperature controller 10. On the other hand, after mounting the temperature controller 10, the strain relief device 23 is inserted, in particular screwed, which seals opening 12 against the environment, so that opening 12 forms a cable bushing.

Alternatively, a sealing compound can be used to seal opening 12.

Figure 5:
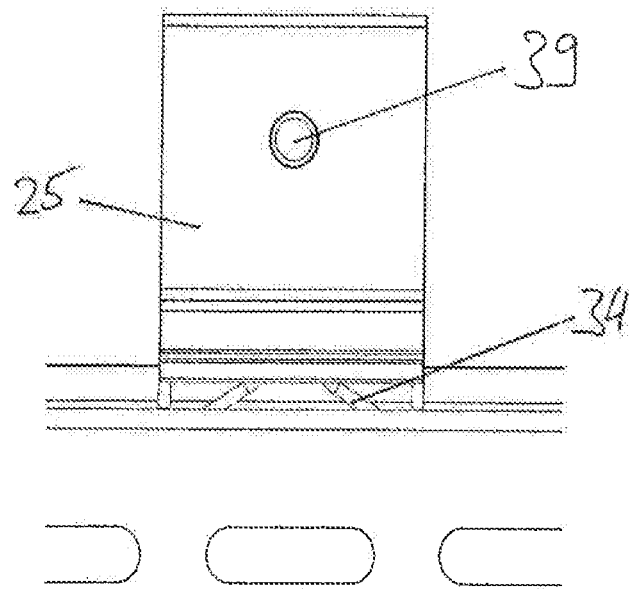
FIG. 5 shows a rear view of the device according to FIG. 1 with a top-hat rail attached to the device.
Figure 5:
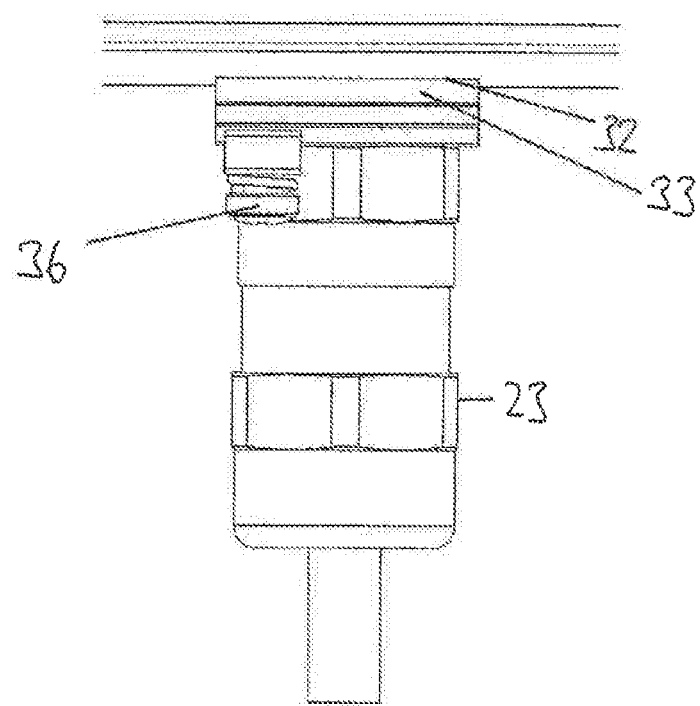
Figure 6:
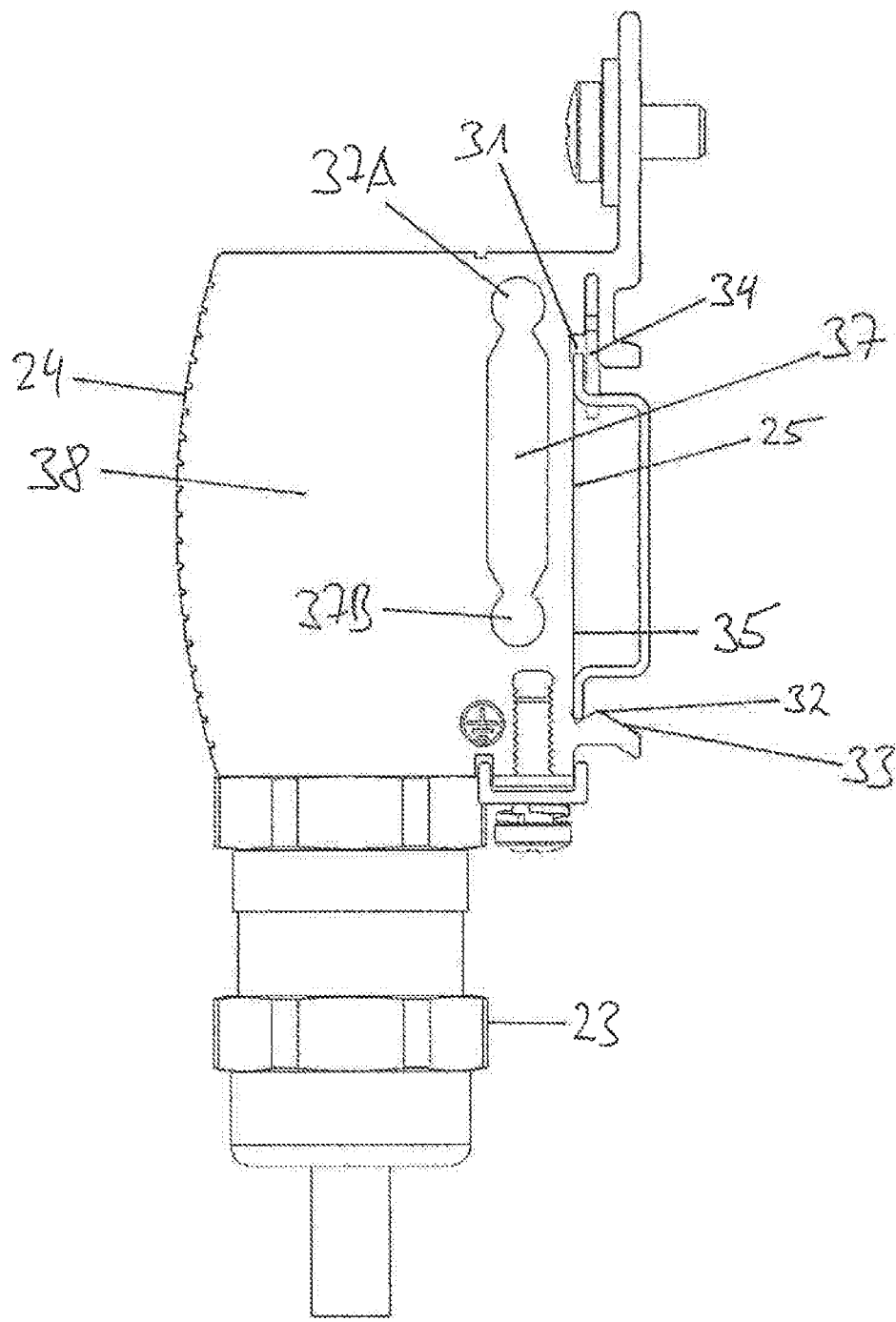
FIG. 6 shows a side view of the device according to FIG. 1 with a top-hat rail attached to the device.

The retaining profile 26 is used to connect the housing 11 to a top-hat rail, as shown in FIGS. 5, 6. For this purpose, the retaining profile 26, as shown in FIGS. 1, 2 and 6, has a receiving slot 31 and a latching edge 32 arranged parallel to the receiving slot 31. The receiving slot 31 and the latching edge 32 extend essentially parallel to the underside 28 of the housing 11. The latching edge 32 is connected to an inlet slope 33, at which the lower edge of the top-hat rail is guided when the housing 11 is clipped in. The top-hat rail is guided over the latching edge 32 and engages in the gap between the latching edge 32 and the rear wall 35 of the housing 11, as shown in FIGS. 5, 6.

A retaining clamp 34 or holding clamp or tension spring or spring clip is arranged in the receiving slot 31, which rests against the bottom of the receiving slot 31 on the one hand and against the top-hat rail on the other. The retaining clamp 34 is used to latch the housing 11 with the top-hat rail when the top-hat rail is guided over the latching edge 32. The retaining clamp 34 is compressed during locking and thus allows overcoming the latching edge 32. If the latching edge 32 is arranged in the gap between the rear wall 35 and the latching edge 32, the retaining clamp 34 exerts a spring force on the top-hat rail, which securely fixes the housing 11 with it.

A groove 29 is formed on the underside 28 of the housing 11, which has an internal toothing 30. Groove 29 extends parallel to the underside 28 over the entire width of the housing 11 and serves to hold a retaining screw 36, as shown in FIGS. 2 and 6. The retaining screw 36 is used to connect the housing 11 to an earthing cable. The retaining screw 36 can be moved laterally in the groove 29.

The housing has screw openings 37A, 37B at the rear for lateral mounting. Another opening, in particular a borehole 39, is provided on the rear side of the housing for standard screw mounting.

The housing 11 is manufactured as follows.

The basic shape of the housing 11 is formed by extrusion. A solid housing block is produced with the outer profile shown in FIG. 1. The outer profile comprises the retaining profile 26 at the rear side 25 of the housing 11, a curved surface at the front 24 and the groove 29 with the internal toothing. The cavity 37 at the rear side 25 of the housing 11 is also formed during extrusion.

The receiving spaces 27 are inserted into the solid, strand-shaped housing block at the underside 28, for example by drilling. Then the housing block is cut to length, i.e. cross-cut. This results in several housings, one of which is shown in FIGS. 1 to 6.

All edges and surfaces of the housing 11 extend in the direction of extrusion, i.e. also the latching edge 32, the inlet slope 33, the receiving slot 31 and the groove 29. Only the side surfaces 38 of the housing 11, which are created during transverse cutting, and the receiving space 27 are oriented in a different direction, since these are not formed during extrusion.

The receiving spaces 27 can be inserted individually into the housing block before cross-cutting or after cross-cutting. As shown in FIG. 4, in the illustrated exemplary embodiment, each housing has a single receiving space 27.

LIST OF REFERENCE NUMERALS

10 Temperature controller
11 Housing
12 Opening
13, 14 Electrical lines
15 Measuring surface
16 Inner wall
17 Earthing tab
18 Further line
19 Side wall
20 End face
21 Free end
22 Shoulder
23 Strain relief device
24 Front side
25 Rear side
26 Retaining profile
27 Receiving spaces
28 Underside
29 Groove
30 Internal toothing
31 Receiving slot
32 Latching edge
33 Inlet slope
34 Retaining clamp
35 Rear wall
36 Retaining screw
37 Cavity
37A, 37B Lateral screw fastening
38 Side surfaces
39 Borehole for standard screw fastening

The invention claimed is:

1. Device for temperature control in potentially explosive areas, having a temperature controller (10) and a housing (11) in which the temperature controller (10) is arranged, wherein the housing (11) has a sealed opening (12) through which electrical lines (13, 14) of the temperature controller (10) are passed, characterized in that the temperature controller (10) has a measuring surface (15) which lies directly against an inner wall (16) of the housing (11) at least in sections and is electrically connected to an earthing tab (17), wherein:

the earthing tab (17) is electrically connected to a further line (18) which is guided through the opening (12) and in particular forms a unit; and the earthing tab (17) extends along a side wall (19) of the temperature controller (10) and projects over its end face (20).

2. Device for temperature control in potentially explosive areas, having a temperature controller (10) and a housing (11) in which the temperature controller (10) is arranged, wherein the housing (11) has a sealed opening (12) through which electrical lines (13, 14) of the temperature controller (10) are passed, characterized in that the temperature controller (10) has a measuring surface (15) which lies directly against an inner wall (16) of the housing (11) at least in sections and is electrically connected to an earthing tab (17), wherein:

the earthing tab (17) is electrically connected to a further line (18) which is guided through the opening (12) and in particular forms a unit; and the earthing tab (17) has a free end (21) angled towards the temperature controller (10).

3. Device for temperature control in potentially explosive areas, having a temperature controller (10) and a housing (11) in which the temperature controller (10) is arranged, wherein the housing (11) has a sealed opening (12) through which electrical lines (13, 14) of the temperature controller (10) are passed, characterized in that the temperature controller (10) has a measuring surface (15) which lies directly against an inner wall (16) of the housing (11) at least in sections and is electrically connected to an earthing tab (17), wherein:

the earthing tab (17) is electrically connected to a further line (18) which is guided through the opening (12) and in particular forms a unit; and the measuring surface (15) forms a lateral shoulder (22) which is electrically connected to the earthing tab (17).

4. Device according to claim 1, characterized in that a strain relief device (23) of the lines (13, 14, 18) is arranged in the opening (12).

5. Device according to claim 1, characterized in that the temperature controller (10) is formed rotationally symmetrical, in particular in the form of a button thermostat.

6. Device according to claim 1, characterized in that the temperature controller (10) is connected to the inner wall (16) of the housing (11) in a materially bonded manner by a contact connection.

7. Device according to claim 1, characterized in that the temperature controller (10) has a bimetal switch.

8. Use of the device according to claim 1 as contact controller or as room controller.

* * * * *